May 30, 1967  J. J. AFFEL ETAL  3,322,380
METER BAYONET LOCK

Filed Sept. 1, 1964  2 Sheets-Sheet 1

INVENTORS
Josef von Nemeth
John Joe Affel

By Norton Lesser
Attorney

May 30, 1967 J. J. AFFEL ETAL 3,322,380
METER BAYONET LOCK
Filed Sept. 1, 1964 2 Sheets-Sheet 2

INVENTORS
Josef von Nemeth
John Joe Affel

By Norton Lesser
Attorney excellent# United States Patent Office 3,322,380
Patented May 30, 1967

3,322,380
METER BAYONET LOCK
John Joe Affel and Josef von Nemeth, Chicago, Ill., assignors to Stewart-Warner Corporation, Chicago, Ill., a corporation of Virginia
Filed Sept. 1, 1964, Ser. No. 393,666
5 Claims. (Cl. 248—27)

ABSTRACT OF THE DISCLOSURE

The following specification discloses a pair of wire legs fastened on a meter housing with the ends of the legs spaced from a flange on the front of the meter by a distance less than the thickness of the panel in which the meter is mounted. Insertion of the meter through the opening from the front of the panel and rotation of the meter flexes the legs so that they engage the panel back under compression to hold the meter locked in position. A tool for easily removing the meter is also disclosed.

---

This invention relates in general to meter mounting assemblies and more particularly to an arrangement for mounting a meter in a panel by means of a bayonet-type lock.

The usual arrangement for mounting a meter in the panel of an automobile, for example, is to insert the meter housing through the panel opening and assemble a U-shaped bracket to a pair of studs at the back of the meter housing. The legs of the U-shaped bracket are drawn tightly against the back surface of the panel by tightening a nut on each stud as the bezel flange of the meter is simultaneously forced snugly against the front surface of the panel. This arrangement is quite inconvenient both on initial assembly of the meter and in subsequent removal since assembly and disassembly require tightening or loosening of the nuts and in addition the operation must often be carried out in cramped quarters between the dashboard and the firewall of the automobile without easy access or visibility.

In order to avoid the aforementiond problems, the present invention incorporates a rather unique and simple scheme for permitting quick insertion and locking of the meter in position together with facile removal of the meter from the front of the panel. Briefly, this is done by simply utilizing a bayonet-type lock for the meter in which a pair of wire spring legs secured at one end to the meter housing have their free ends spaced from the bezel flange by a distance less than the panel wall thickness. Thus, the axial length of the legs is greater than the distance between the position on the meter in which they are supported and the back of the panel so that they overlap the panel and exert substantial pressure against the rear of the panel when the meter is fully inserted in the panel. This pressure is extended primarily along the longitudinal or columnar axis of the legs and parallel to the axis of the opening to draw the bezel of the meter snugly against the front surface of the panel, but since the legs may be flexed easily in a direction transverse to the columnar axis facile rotation and removal of the meter is permitted.

Thus, the meter housing and legs are simply inserted through the front of the panel with the wire legs passing through suitable notches adjacent the opening which receives the meter housing. The meter is thereafter rotated and since the legs are of a cross section to flex easily in a transverse direction, they are drawn through the notches and flex against the back wall of the meter with their greatest pressure now being exerted to draw the meter snugly against the panel. In addition, a locating key on the meter housing is adapted to be rotated to a position in correspondence with one of the notches on the panel so that when the two are aligned and the pressure on the springs somewhat relieved, the key slides into position in the notch and thereafter prevents rotation of the meter. This also, of course, serves to properly align the dial in the meter with respect to the panel or with other meters in the panel.

To remove the meter from the front of the panel, the bezel of the meter is simply grasped preferably by an appropriate tool and pressure exerted against the back pressure of the spring legs causing them to flex. The locating key is, therefore, withdrawn from its notch and rotation of the meter is permitted to align the wire legs with the notches. With the wire legs aligned with the notches, the pressure thereon is relieved and the meter is simply withdrawn the remaining distance from the front of the panel.

It is, therefore, a primary object of the present invention to provide an improved arrangement for fastening a meter in a panel.

It is another object of the present invention to provide a bayonet-type locking arrangement for a meter which enables the meter to be easily fastened or removed from the front of a panel.

It is still another object of the present invention to provide an improved arrangement for locking a meter in a panel by means of a pair of wire legs which permit either quick insertion or removal of the meter from the panel.

It is still another object of the present invention to provide an improved arrangement for removing a meter employing a bayonet-type lock from the front of a panel in which the meter is held by said lock.

Other objects and features of the present invention will become apparent upon examination of the following specification and claims, together with the drawings wherein:

Figure 1:
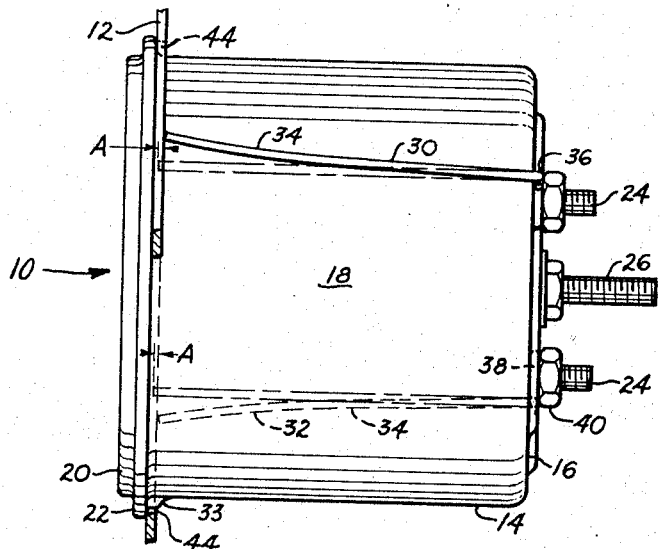
FIG. 1 is a side elevational view illustrating a meter mounted in a partially shown panel.
Figure 2:
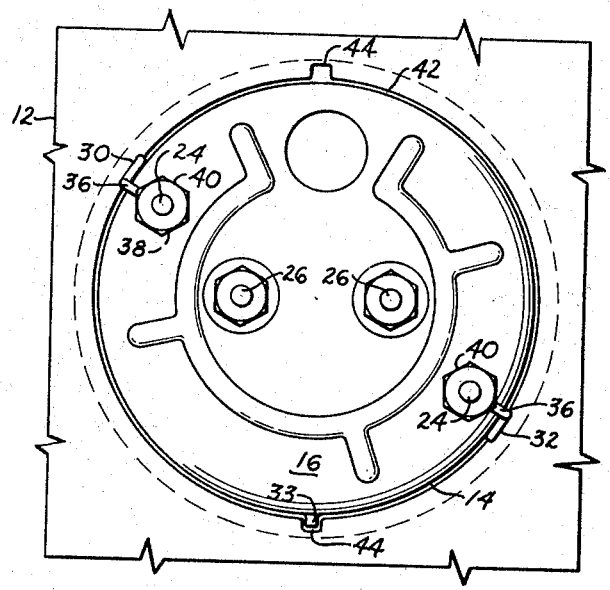
FIG. 2 is a rear view of the meter mounted in a panel.
Figure 3:
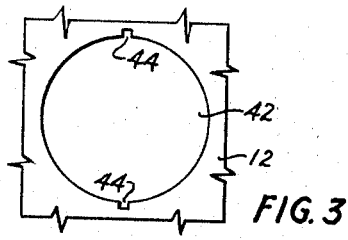
FIG. 3 illustrates a portion of a panel in which the meter is adapted to be mounted.

Referring now to FIGS. 1–7, a gauge or meter is indicated in FIG. 1 by the reference character 10 and a panel in which the meter is mounted is indicated by the reference character 12. The meter comprises a conventional cup-shaped housing 14 defined by a back wall 16 and an annular side wall 18. The diameter of the annular side wall 18 may range, for example, from less than 2″ to over 3″. A bezel 20 for retaining a face plate (not shown) is supported at the end of wall 18 with the bezel 20 having a conventional peripheral flange 22 thereon set back slightly from the front of the bezel. Mounting studs 24 are shown at the rear of the housing 10, together with any other necessary apparatus such as electrical terminals 26 or other apparatus for use in transmitting signals to the meter.

The meter 10 may comprise any indicating device for use in automobiles, motorcycles, trucks or tracked vehicles, for example, or in any arrangement where meters are commonly mounted in a panel and may be of such character as a tachometer, speedometer or oil pressure gauge or any of the number of similar devices. As stated previously, a popular arrangement for mounting the meter in a panel comprises assembling a U-shaped bracket (not shown) to the meter by inserting the mounting studs 24 through the back leg of the bracket after the meter is inserted in a panel. Nuts are then tightened on the studs 24 against the back leg of the U-shaped bracket to press the side legs forward against the back of the panel and tighten the meter in position. This necessitates reaching behind the panel which is, of course, a cumbersome procedure and to avoid this, the present invention utilizes the wire springs 30 and 32 together with a key 33 shown on the annular side wall 18 of the meter adjacent the flange 22.

These springs 30 and 32 simply comprise a length of L-shaped round wire defined by an elongate leg 34 and a short leg 36 with the short leg 36 having a loop 38 formed therein in order to be engaged over the mounting studs 24. Convenient diameters for the wire may be from .059" to .064" for housing diameters of the size described. The loops 38 are fastened to the mounting studs 24 by means of nuts 40 so that the legs 34 extend generally parallel to and flush with the side wall 18 of the housing toward the bezel 20. Alternatively, the springs 30 and 32 may be welded, for example, to the housing or fastened thereto in any other convenient manner.

The back wall 16 of meter 10 is simply inserted through an opening 42 from the front of the panel 12. Since the diameter of wall 18 corresponds closely to the diameter of opening 42 and the wire springs 30 extends beyond this diameter by an amount corresponding to the diameter of legs 34, a pair of notches 44 are provided at opposite ends of a diameter of the opening 42. The legs 34 are, therefore, initially aligned with and pass through the notches 44. After the meter housing 14 passes through the opening and just about the time the key 33 engages the front face of the panel, the meter 10 is twisted or rotated.

The wire legs 34 are thus flexed in a direction transverse to their longitudinal axis and they ride up on the back surface of the panel 12. The length of legs 34 is chosen so that the distance between the flange 22 and the end of legs 34 is about .010 to .015 of an inch less than the thickness of the panel 12 as indicated at A in FIG. 1 so that the springs can ride up onto the back wall of the panel without difficulty and still exert substantial force to pull the meter 10 through the opening 42 as soon as the legs 34 ride up on the back wall of the panel. As the meter 10 is rotated, the key 33 prevents the meter from being fully seated in the opening until the key 33 is aligned with one of the notches 44. The springs 30 and 32 are then allowed to pull the meter 10 the remaining distance through the opening 42 and the key 33 engages in the aligned notch 44 and further rotation is prevented. At that time the flange 22 acts as a stop for limiting movement of the meter through the panel opening.

Since the distance between the flange 22 and the ends of legs 34 is slightly less than the thickness of the panel the springs exert tension along their columnar or longitudinal axis and generally parallel to the axis of opening 42 against the back wall of the panel 12 to hold the meter 10 tightly in position against movement transverse to the panel 12. In order to accommodate the difference in length between the springs and the wall thickness of the panel 12, the legs 34 are, of course, flexed slightly as shown in FIG. 1 when the meter is fully seated; however, since any force tending to remove the meter from the panel has to be exerted along the columnar or longitudinal axis of the legs 34, the meter is held very snugly.

Figure 6:
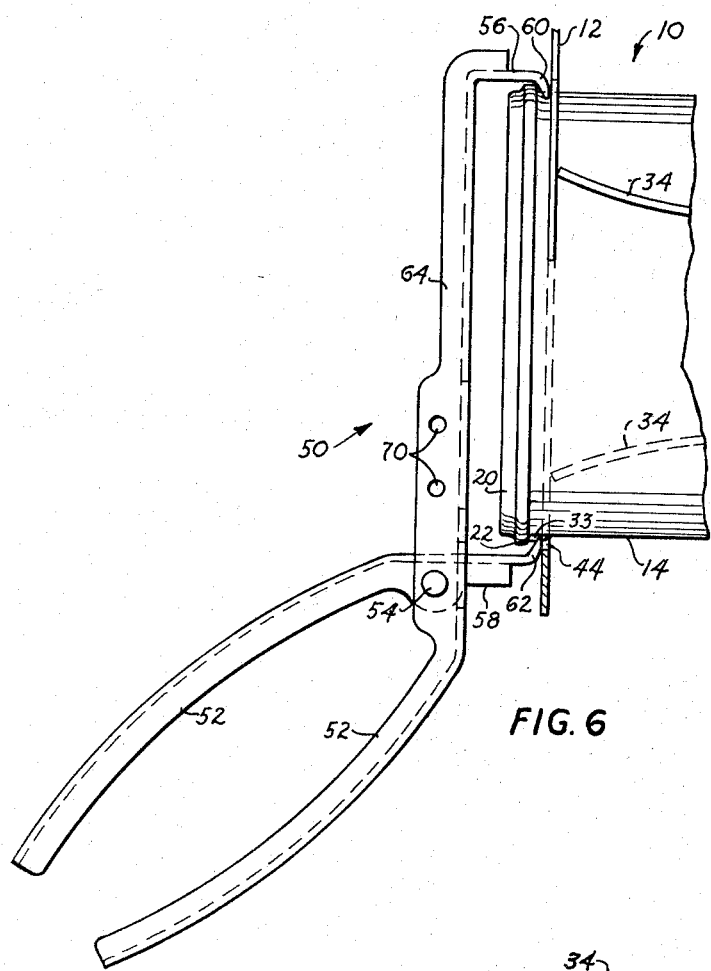
FIG. 6 illustrates a simple tool engaged with the meter for removing the meter from a panel.
Figure 7:
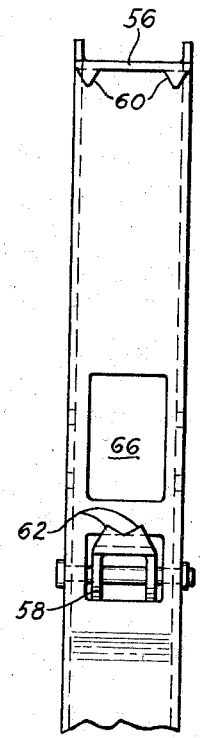
FIG. 7 is a fragmentary front end view of the tool utilized to remove the meter from the panel.
Figures 4, 5:
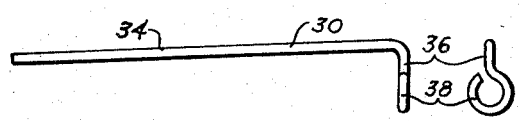
FIG. 4 is a side elevational view of one wire spring.
FIG. 5 is an end view of the wire spring shown in FIG. 4.

In order to remove the meter 10 from the front of the panel 12, a simple pliers-like tool 50 is employed, as shown in FIG. 6. The tool 50 comprises lever handles 52 pivotally connected at 54 for moving a pair of opposed jaws 56 and 58 towards or away from each other. The jaw 56 has a pair of spaced apart angularly disposed teeth 60 adapted to straddle a portion of the periphery of the housing 14, while the jaw 58 has a pair of adjacent teeth 62 adapted to straddle the key 33 if necessary.

Both sets of teeth 60 and 62 are adapted to be wedged between the bezel flange 22 and the front surface of the panel in response to pressure exerted on the lever handles 52 for closing jaws 56 and 58. The meter 10 is wedged outwardly in response to the closure of jaws 56 and 58 against the tension of spring legs 34, and the ear 33 is removed from the notch 44 to permit the meter 10 to be easily rotated. The meter is, therefore, rotated until the ends of legs 34 engage the notches 44. Pressure on the spring legs 34 is, therefore, released and the meter is simply moved through the front of the panel 12 to disengage therefrom.

It will be noted that the tool jaw 56 is formed as a horizontal extension of a vertical leg 64 on one of the lever handles 52. An opening 66 is provided in the leg 64 through which jaw 58 may be inserted and pivotally connected to the leg 64 by means of apertures 70. This permits the range of meter sizes with which tool 50 may be used to be vastly increased with a minimum of expense in tooling since a simple change in location of the parts permits a different range of meter sizes to be manipulated.

The foregoing comprises an explanation of an improved technique for mounting a meter or gauge in a panel and disengaging the same from the panel, the inventive concepts of which are believed to be more fully set forth in the accompanying claims.

What is claimed is:

1. For use with a meter of the type adapted to be mounted in a panel opening having widened portions and extending between the front and rear surfaces of the panel with said meter having a housing adapted to pass through said opening with a flange on one end of said housing adapted to abut the front panel surface adjacent said opening, the improvement comprising a pair of elongate wire legs on said housing each of a cross section permitting flexure in a direction transverse to a radial line from the axis of said opening and each having its elongate axis aligned parallel to the axis of said opening with one end of each leg being free and separated from said flange by a distance less than the thickness of said panel. said legs each passing through one of said widened portions of said opening on insertion of said housing in said panel opening and thereafter engaging with the edge of the adjacent widened portion and flexing in response to rotation of said housing to enable the free end of each leg to ride over the engaged edge for abutment solely with the rear surface of said panel under stress primarily along the respective elongate axis of each wire.

2. For use with a meter of the type having a housing adapted to be passed through a panel opening extending between the front and rear surfaces of the panel with said opening having notch portions of greater radial dimension than other portions of said opening for receiving formations on said meter exterior to said housing and with said housing having a flange on one end for abutment with the front surface of the panel about said opening, the improvement comprising a pair of spaced elongated wires on said housing each having its elongate axis aligned generally parallel to the axis of said housing with one end of each wire being free and separated from said flange by a distance less than the thickness of said panel, each leg having a cross sectional dimension permitting flexure in a direction transverse to a radial line from the axis of said opening and passing through one of said notch portions on passage of said housing through said panel opening and thereafter engaging the edge of the adjacent notch portion and flexing in response to rotation of said housing in said panel opening to enable the free end of each leg to ride over the engaged edge for abutment solely with the rear surface of said panel under stress primarily along the respective elongate axis of each wire, and a locating key on said meter adjacent said flange initially preventing abutment of said flange and panel on passage of said housing through said opening and aligned by rotation of said housing with one of said notch portions whereby the stress on said legs serves to automatically seat said key in said aligned notch portion for locating said meter in a predetermined position relative said panel.

3. An assembly comprising a panel having an opening therein with notches in said panel adjacent said opening, a meter having a housing adapted to pass through said opening and carrying a flange adjacent one end for engaging said panel about said opening and adapted to act as a stop, a pair of wire legs each having one end fixedly engaged with said housing and a free end extending parallel to the axis of said housing and terminating at a position spaced from said flange by a distance less than the thickness of said panel, each leg having a cross sectional dimension permitting flexure of the respective leg in a direction transverse to a radial line from the axis of said opening whereby the passage of said legs through a respective one of said notches and the rotation of said housing engages the free ends of said legs against the back surface of said panel under pressure along the elongate axis of said legs to force said flange against the front surface of said panel.

4. An assembly comprising a panel having an opening therein with notches in said panel adjacent said opening, a meter having a cup-shaped housing adapted to pass through said opening and carrying a flange adjacent one end for engaging said panel about said opening and adapted to act as a stop, a pair of mounting studs on the back wall of said cup-shaped housing, a pair of L-shaped wire legs each having a loop in one leg adapted to be fixedly engaged with a respective one of said mounting studs with each other leg extending along the side wall of said housing and terminating at a position spaced from said flange by a distance less than the thickness of said panel whereby the passage of said other legs through a respective one of said notches and the rotation of said housing engages said other legs with the back wall of said panel under pressure along the elongate axis thereof to force said flange towards said panel, and a key on said side wall adjacent said flange adapted to be engaged in one of said notches when said key is aligned with one of said notches to thereby prevent further rotation of said meter and enable said flange to be drawn tightly against the front surface of said panel by said other legs.

5. An assembly comprising a panel having an opening therein with notches in said panel adjacent said opening, a meter having a cup-shaped housing adapted to pass through said opening and carrying a flange adjacent one end for engaging said panel about said opening and adapted to act as a stop, a pair of mounting studs on the back wall of said cup-shaped housing, a pair of L-shaped wire legs each having a loop in one leg for engaging a respective one of said mounting studs with the other leg extending parallel to the axis of said housing and terminating at a position spaced from said flange by a distance less than the thickness of said panel and adapted to pass through a respective one of said notches, means for fastening said loops to said studs, and a key on said housing adjacent said flange, whereby the rotation of said housing causes the ends of said other legs to engage the back surface of said panel under pressure along the elongate axis of said other legs to force said flange against said panel when said key is aligned with one of said notches and engages therein to thereby prevent further rotation of said meter.

References Cited

UNITED STATES PATENTS

| | | | |
|---|---|---|---|
| 1,179,469 | 4/1916 | Stephenson | 248—27 |
| 1,398,373 | 11/1921 | Graesser et al. | 248—27 |
| 2,115,109 | 4/1938 | Jones | 29—278 X |
| 2,408,737 | 10/1946 | Cormier | 81—3.44 X |
| 2,748,636 | 6/1956 | Busby | 81—3 |
| 2,793,782 | 11/1957 | Austin | 248—27 |
| 3,131,896 | 5/1964 | Ingraham | 248—27 |

LOUIS R. PRINCE, *Primary Examiner.*

D. M. YASICH, *Assistant Examiner.*